(12) United States Patent
Smithson et al.

(10) Patent No.: US 6,691,943 B2
(45) Date of Patent: Feb. 17, 2004

(54) SEAT BELT RETRACTOR WITH A WEB SENSOR

(75) Inventors: Alan George Smithson, Corby Hill (GB); David Blackadder, Corby Hill (GB); Paul Bowman, Little Corby (GB); David Charles Winter, Carlisle (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/212,755

(22) Filed: Aug. 7, 2002

(65) Prior Publication Data

US 2003/0189121 A1 Oct. 9, 2003

(30) Foreign Application Priority Data

Apr. 8, 2002 (EP) .............................. 02252506

(51) Int. Cl.[7] .............................................. B60R 22/38
(52) U.S. Cl. .................................................. 242/383.2
(58) Field of Search ........................ 242/383.2, 383.4, 242/383.5, 384, 384.2, 384.5, 384.6; 280/806; 297/478

(56) References Cited

U.S. PATENT DOCUMENTS

| | | | | |
|---|---|---|---|---|
| 3,823,893 A | * | 7/1974 | Svensson | ................ 242/383.4 |
| 3,895,539 A | * | 7/1975 | Weman et al. | ............... 242/384 |
| 3,952,966 A | * | 4/1976 | Burleigh | ................... 242/384.2 |
| 4,101,092 A | * | 7/1978 | Schmelow et al. | ......... 242/384 |
| 4,619,418 A | | 10/1986 | Butenop | |
| 4,858,847 A | * | 8/1989 | Ogris | ....................... 242/384.6 |
| 5,482,224 A | | 1/1996 | Fujimura et al. | |
| 5,487,515 A | * | 1/1996 | Hishon et al. | ............ 242/384.6 |
| 5,931,402 A | * | 8/1999 | Weller | ...................... 242/384.2 |
| 6,068,208 A | * | 5/2000 | Matsuki et al. | .............. 280/806 |
| 6,305,633 B1 | * | 10/2001 | Asagiri et al. | ............ 242/383.2 |
| 6,585,184 B1 | * | 7/2003 | Park et al. | ................ 242/383.2 |

FOREIGN PATENT DOCUMENTS

JP         7-144605         6/1995

* cited by examiner

Primary Examiner—William A. Rivera
(74) Attorney, Agent, or Firm—Jarett Rieger; Lonnie Drayer

(57) ABSTRACT

A seat belt retractor has a web sensor with an inertia member, a locking pawl and a lock cup. The inertia member is eccentrically pivotally mounted to the lock cup. The locking pawl is integrally formed with the inertia member. The lock cup has a set of radially inwardly pointing teeth for engaging with the locking pawl. The shape and profile of the locking pawl complements the shape of the teeth. The web sensor aids in resisting jamming of the seat belt retractor.

6 Claims, 8 Drawing Sheets

SEAT BELT RETRACTOR WITH A WEB SENSOR

FIELD OF THE INVENTION

The present invention relates to a seat belt retractor with a web sensor.

BACKGROUND OF THE INVENTION

A vehicle safety restraint traditionally comprises a seat belt in a so-called three-point configuration. The seat belt comprises a strong woven belt webbing material attached to the vehicle so that it passes horizontally over the lap of a vehicle occupant and diagonally across the vehicle occupant's torso. Usually one end of the belt webbing is fixed to a structural member such as the floor of the vehicle, typically between a seat and a side of the vehicle. The seat belt then passes across the lap of a vehicle occupant and is releasably fastened to a buckle mounted to a structural member of the vehicle on the other side of the seat. Subsequently the seat belt passes diagonally across the torso of the vehicle occupant and through the loop of a ring attached to a side pillar at approximately the shoulder height of the vehicle occupant. The seat belt then passes vertically downwards and the other end of the seat belt is attached to a seat belt retractor that is bolted to a structural member of the vehicle, such as the floor.

The belt webbing is wound on a cylindrical spool of the seat belt retractor which is spring biased to keep the belt webbing wound onto the seat belt retractor and thus to keep the seat belt secure about the vehicle occupant's body. Under normal conditions the spool is free to rotate to pay out belt webbing to provide comfort to the vehicle occupant by allowing movement within certain limits, for example to adjust a car radio or access a storage compartment.

However when a crash occurs, the spool must be locked against further payout of belt webbing to prevent the vehicle occupant moving forward and sustaining injury such as by colliding with the dashboard or front windscreen. Traditionally, this is achieved by providing sensors to detect accelerations or decelerations over predetermined limits. A so-called vehicle sensor detects rapid acceleration or deceleration of the vehicle indicative of a crash. A so-called web sensor detects a sudden pull on the belt webbing indicative of a crash.

A web sensor comprises an eccentrically pivoted inertia member mounted to the spool to rotate with the spool under normal conditions, but biased by a calibration spring. When the spool moves suddenly, indicating a crash, the inertia member lags behind the spool and effectively pivots relative to the spool. The inertia member incorporates an integral locking pawl that engages with teeth on a ratchet wheel, known as a lock cup, attached to the locking system. This locks the spool against further payout of belt webbing and thus secures the vehicle occupant.

However, the integral pawl is at a relatively long distance from the pivot point of the disc and is thus at a particularly acute angle to the load vector. It has been found that this arrangement increases the possibility of the seat belt retractor jamming due to the pawl and the lock cup teeth hitting each other tip to top. Jamming is decreased if a separate locking pawl is used but this increases the cost of the seat belt retractor.

The present invention aims to eliminate the tendency to jam in a cost effective manner.

According to the present invention there is provided an improved arrangement and shape for the locking pawl and of the teeth of the lock cup.

DETAILED DESCRIPTION OF THE INVENTION

Figure 1A:
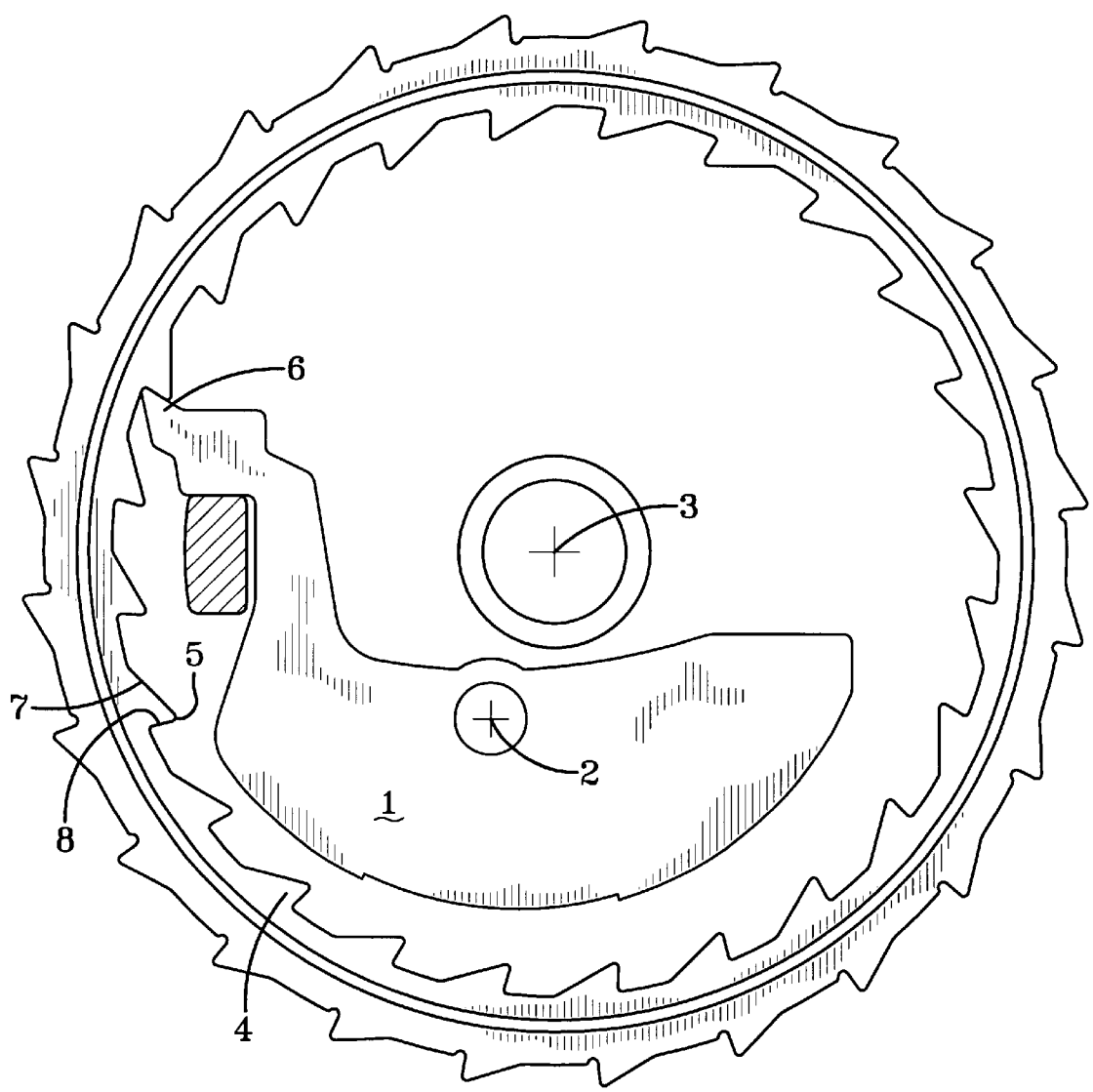
FIG. 1A is a cross sectional view of a seat belt retractor having a web sensor according to one embodiment of the prior art: showing the locking pawl in a full locking position.
Figure 1B:
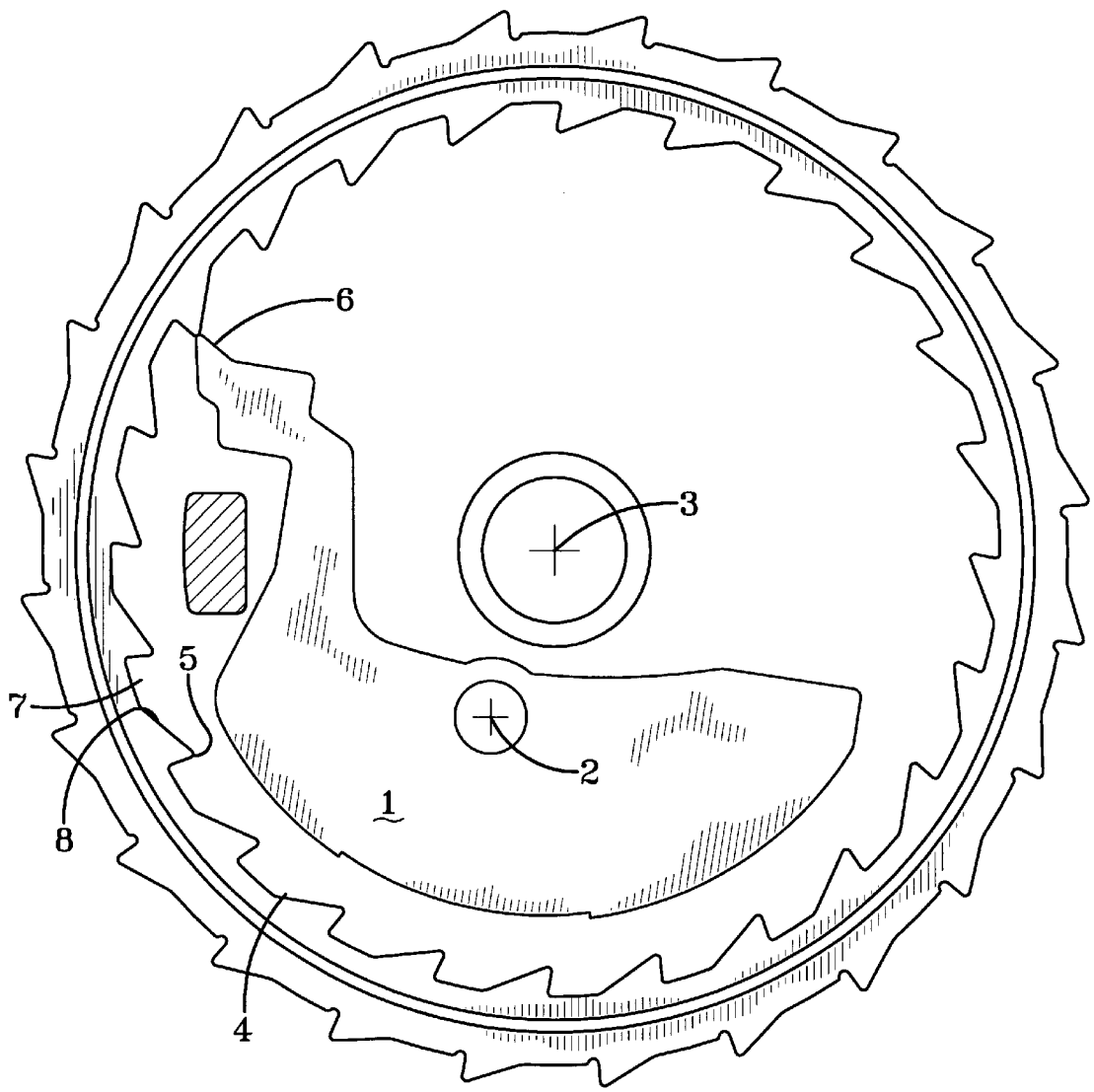
FIG. 1B is a cross sectional view of the web sensor of FIG. 1A showing the locking pawl of the prior art seat belt retractor in a different position.

In FIGS. 1A and 1B a seat belt retractor having a prior art web sensor is shown having an inertia member 1, sometimes referred to as a locking pawl, pivotally mounted at pivot point 2 to a retractor spool (not shown). The pivot point 2 is offset from the axis of the spool which coincides with the axis 3 of a ratchet wheel 4. The ratchet wheel 4 has teeth 5, of saw-tooth cross section, having a trailing edge or long side 7 and a leading edge or short side 8 with a tip between the leading and trailing edge. The teeth are arranged in a regular repeating pattern around the radially inner circumference of the ratchet wheel 4 pointing radially inwardly. The ratchet wheel teeth 5 are engageable with a tooth 6 on the inertia member 1 to lock the spool (not shown) against rotation when a crash is detected. A crash is detected when a sudden change in the speed of rotation of the spool occurs, usually a rapid acceleration, for example as the vehicle occupant exerts a sudden higher force on the seat belt when the vehicle brakes. The inertia member 1 cannot change speed as rapidly as the spool and hence tends to lag the spool and the ratchet wheel 4. There is then a phase different between the inertia member 1 and the ratchet wheel 4 and as the inertia member pivots the tooth 6 on the inertia member engages with the teeth 5 on the ratchet wheel 4, thus locking the spool and securing the vehicle occupant. This is shown in FIG. 1A where the inertia member 6 is fully engaged between the teeth 5 of the ratchet wheel 4. When the force on the vehicle occupant, and thus on the seat belt, abates the teeth 5 on the ratchet wheel and the tooth 6 on the inertia member disengage and the inertia member 1 returns to its normal position relative to the ratchet wheel 14, under the influence of a biasing or calibration spring (not shown).

A problem occurs in the situation shown in FIG. 1B when the tooth 6 on the inertia member 6 engages the tip of a tooth 5 on the ratchet wheel 4 because the angular position of the spool relative to the locking system is incorrect and the parts then tend to jam and will not easily release when the additional forces abate. It can also happen that this condition causes shearing of the tips of the teeth and thus degrades the performance and safety of the seat belt retractor. The angular position of the spool in FIG. 1B is incorrect by an angle of about 10.71 degrees when tip-to-tip locking occurs. An angle of 10.71 degrees corresponds to two-thirds of a tooth spacing. This situation occurs frequently in use of a traditional seat belt retractor and the inertia member does not easily slide off the tips of the teeth 5 and the retractor jams.

Figure 2:
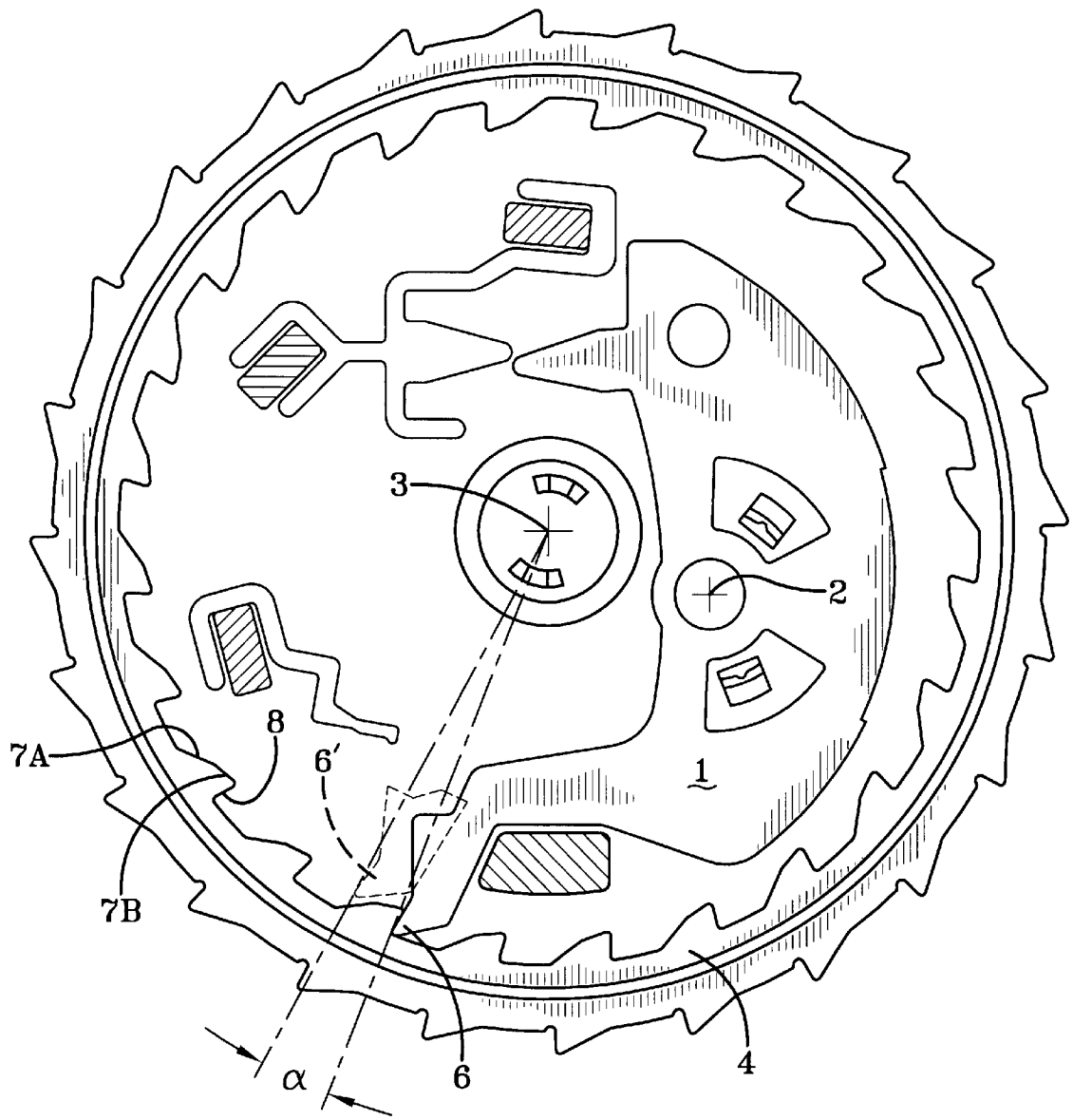
FIG. 2 is a cross sectional view through a seat belt retractor having a web sensor according to another embodiment of the prior art.

In FIG. 2 a prior art attempt to improve a seat belt retractor is shown. In this embodiment the shape of the teeth 5 on the ratchet wheel 4 is changed compared to the shape of the teeth on the ratchet wheel in FIG. 1. The teeth 5 are smaller than the teeth in FIG. 1 and the long sides 7 have two parts, a first part 7A of a relatively steeper gradient and a second part 7B of a relatively shallow gradient. In this case the angular position α of the spool is incorrect by only 6.88 degrees between tip-to-tip engagement of the tooth 6 on the inertia member 1 and full engagement of the tooth on the inertia member but jamming still occurs.

Figure 3:
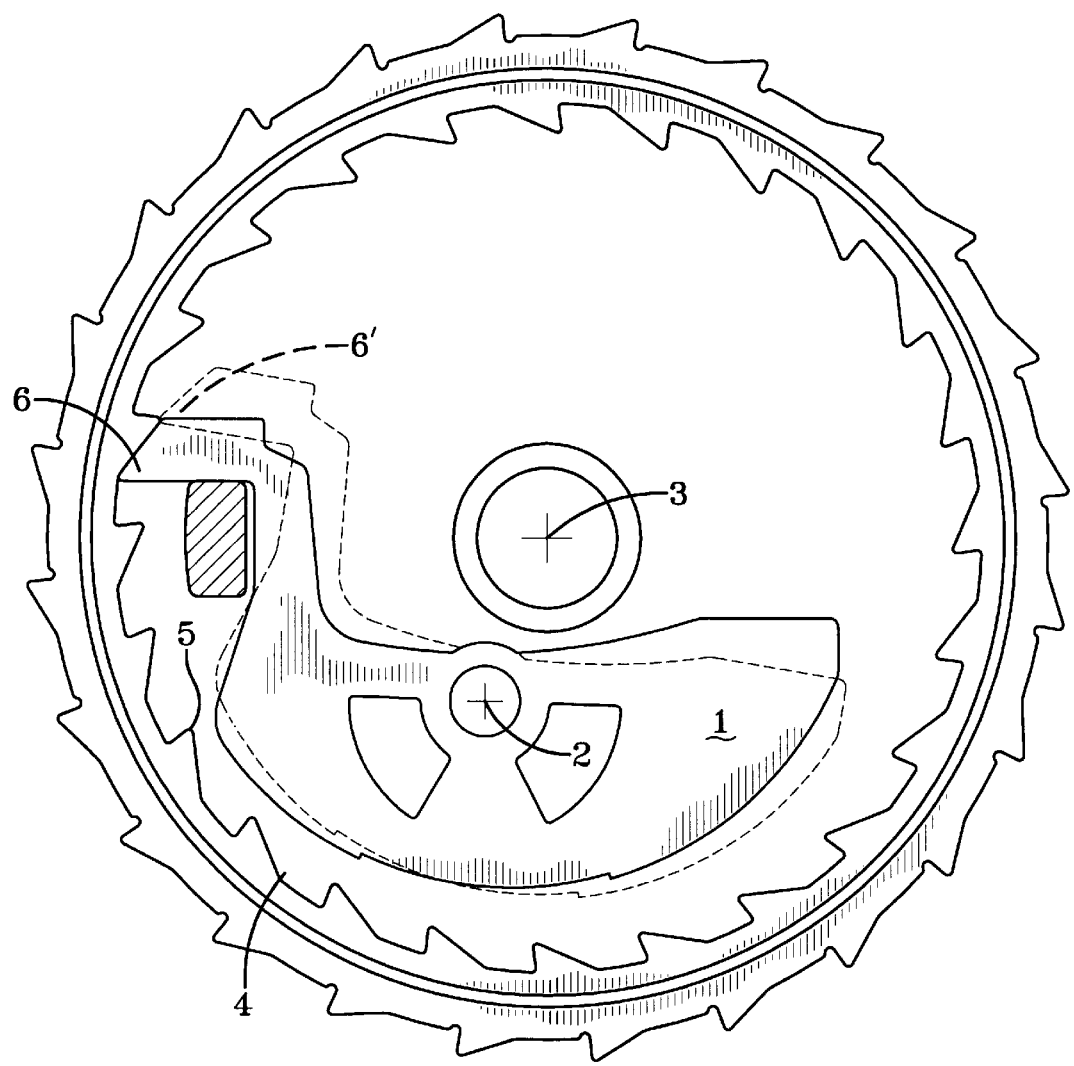
FIG. 3 is a cross sectional view through a seat belt retractor having a web sensor according to one embodiment of the present invention.

FIG. 3 is a cross sectional view through a seat belt retractor having a web sensor according to one embodiment of the present invention. In this new design for a web sensor the teeth 5 on the ratchet wheel 4, also referred to herein as lock cup 4, are shaped to follow the locus of the tooth 6 of the inertia member 1. Put another way, in this embodiment the locus of the trailing edge of the locking pawl matches, or complements, the locus of the trailing edges of the lock cup teeth 5. In this embodiment the angular position of the spool is the same no matter where the tooth 6 of the inertia member locks, i.e. whether it locks fully at the position indicated as 6 or at the tip-to-tip position indicated as 6$^1$. Strength is improved if the profile of the tooth 6 of the inertia member is such that the angle between the leading and trailing edges of the locking pawl is higher than 60 degrees and preferably higher than 70 degrees or even higher. In effect, in this configuration, the tooth gap is filled in.

Figure 4:
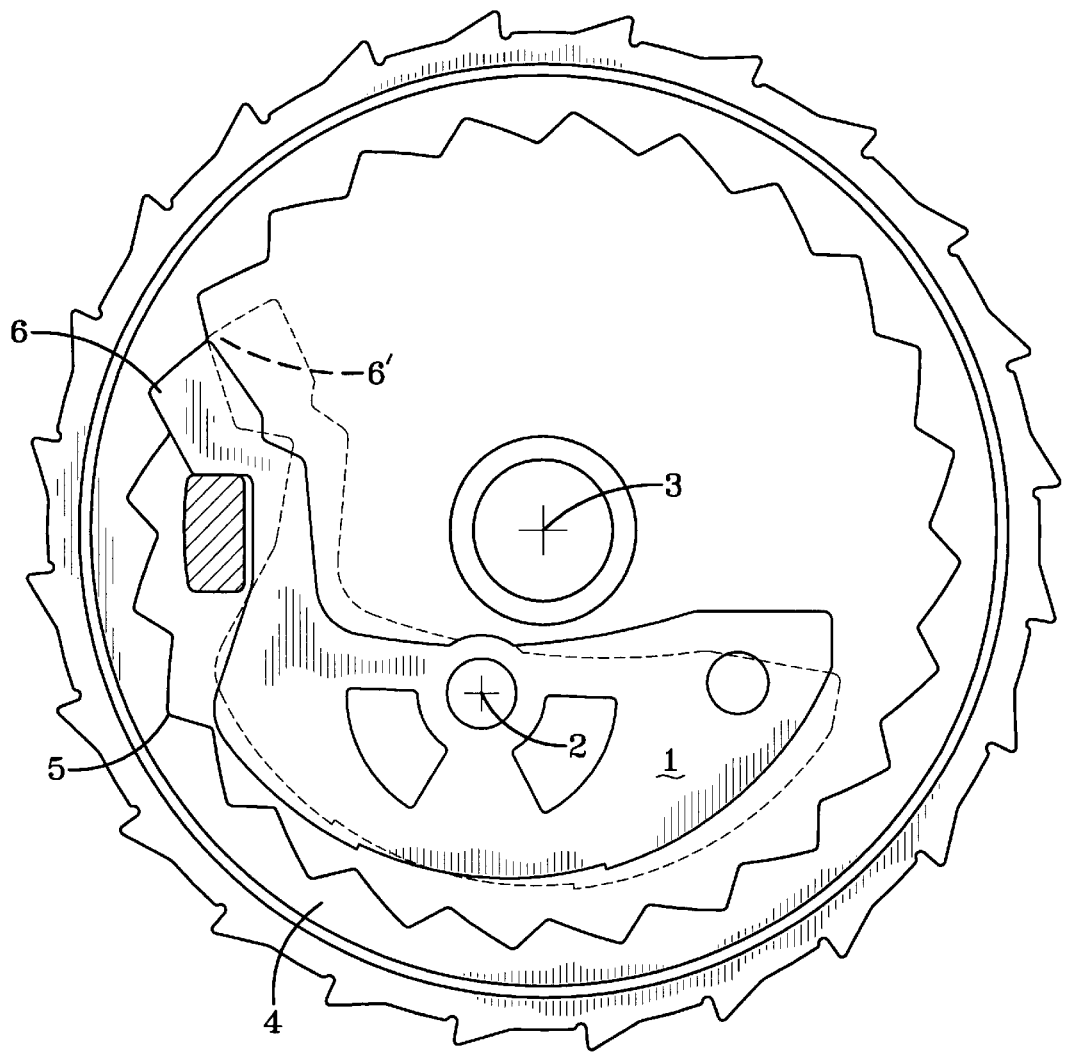
FIG. 4 is a cross sectional view through a seat belt retractor having a web sensor according to a second embodiment of the present invention.

FIG. 4 is a cross sectional view through a seat belt retractor having a web sensor according to a second embodiment of the present invention. In FIG. 4 a variant of the invention is shown in which the tooth 6 on the inertia member 4 takes the form of a square hammer head gaps so that are "filled in". This does not degrade the performance but does improve the strength. Again the position of the full engaged inertia member is shown at 6 and the tip-to-tip position at 6$^1$.

Figure 5:
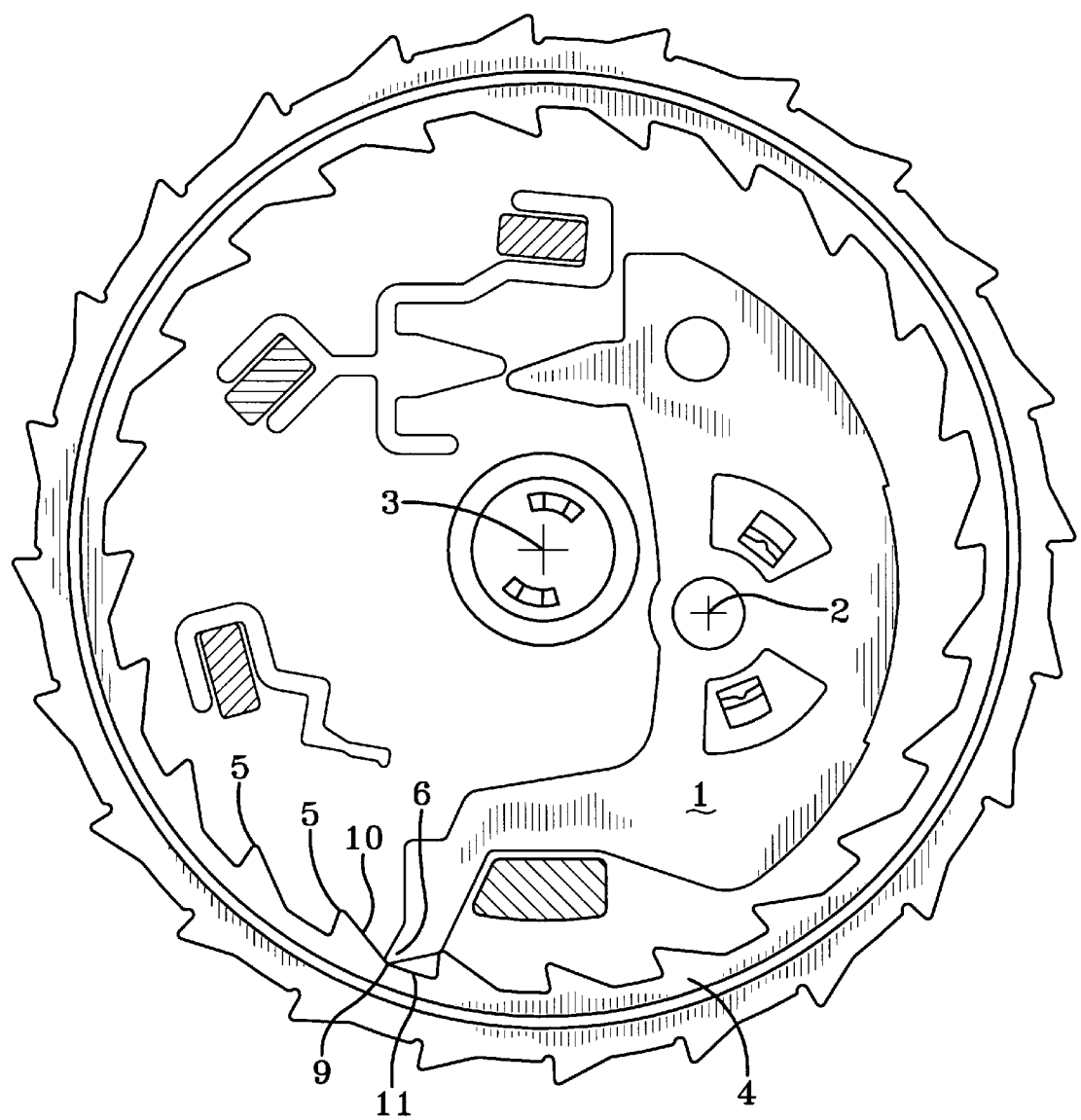
FIG. 5 is a cross sectional view through a seat belt retractor having a web sensor according to a third embodiment of the present invention.

FIG. 5 is a cross sectional view through a seat belt retractor having a web sensor according to a third embodiment of the present invention. FIG. 5 shows yet another variant of the invention in which the tip of the tooth 6 on the inertia member 1 is shaped to dig in to the material of the ratchet wheel 4 to resist skipping. The design of the teeth 5 on the ratchet wheel comprises a corner 9 formed between an arc 10 centered on the pivot point 2 of the inertia member 1, and a flatter portion 11, ie the tip of one tooth 5 and through the end 9 of the adjacent tooth on the ratchet wheel are equidistant from the pivot point 2 of the inertia member.

Figure 6:
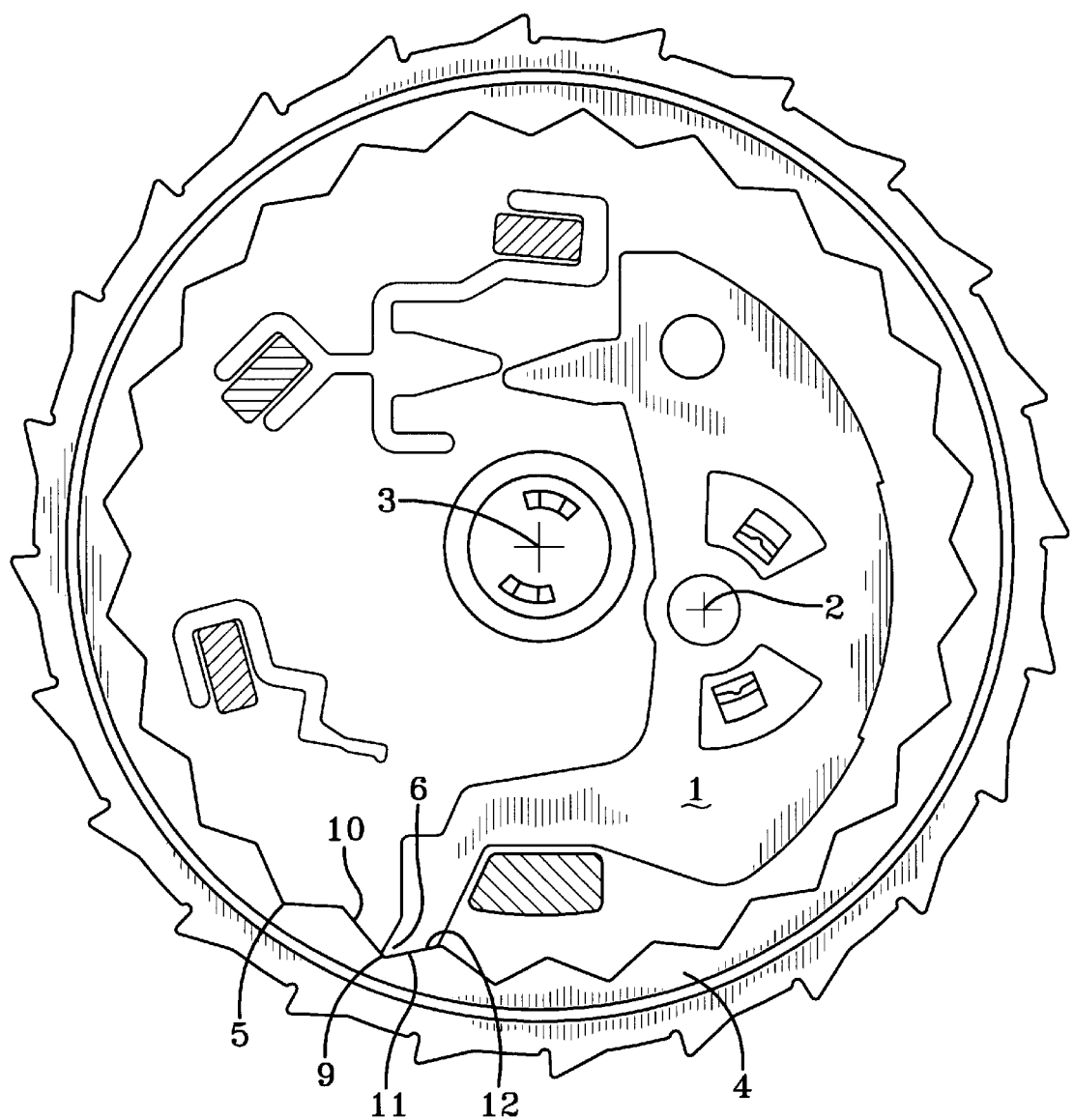
FIG. 6 is a cross sectional view through a seat belt retractor having a web sensor according to a fourth embodiment of the present invention.

FIG. 6 is a cross sectional view through a seat belt retractor having a web sensor according to a fourth embodiment of the present invention. In the embodiment of FIG. 6 the corner 9 between adjacent teeth on the ratchet wheel is formed at a less shallow angle and the face 11 is made the same shape as one face 12 of the tooth 6 of the inertia member 1. Thus the teeth 5 of the ratchet wheel 4 take a slightly eccentric zig-zag cross section and thus have a stronger compressive strength. The embodiments the present invention shown in FIGS. 3 to 6 demonstrate the principal of maintaining the angular position of the spool irrespective of the contact position of the inertia member tooth tip. In practice this type of tooth shape has a limited torque capacity and can also result in skipping of the tooth 6 of the inertia member 1.

Figure 7:
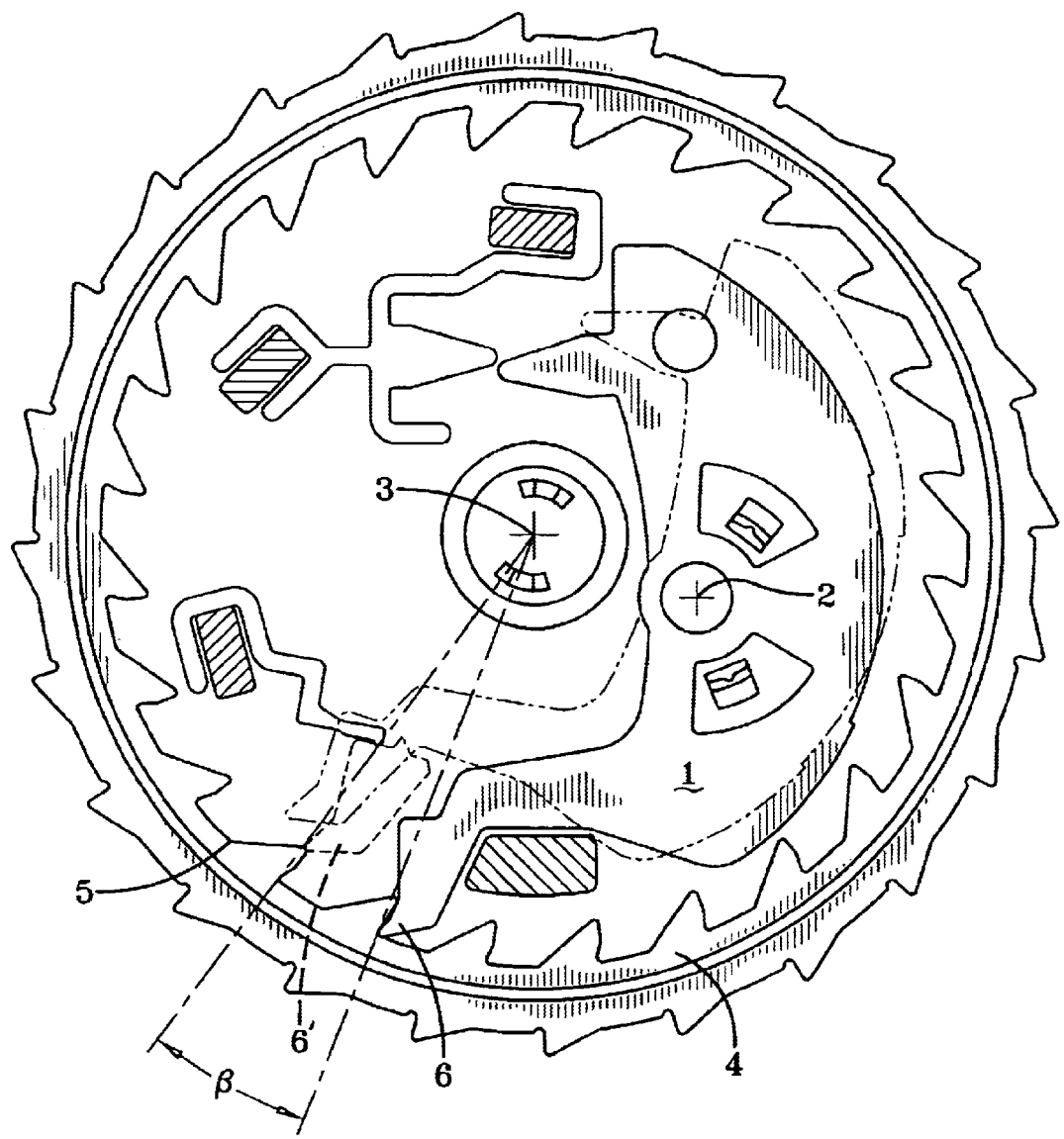
FIG. 7 is a cross sectional view through a seat belt retractor having a web sensor according to a fifth embodiment of the present invention.

FIG. 7 is a cross sectional view through a seat belt retractor having a web sensor according to a fifth embodiment of the present invention. The embodiment of FIG. 7 has longer ratchet teeth 5 in a shark's tooth shape in that they are longer, and the leading edge comprises two sections of different gradients, a first section adjacent the tip and a second section of the same (complementary) profile to the leading edge of the locking pawl. The tooth on the inertia member 6 is also modified. Preferably the angle β subtended at the center of rotation of the lock cup by the position of the locking pawl in full locking engagement with the teeth of the lock cup and the position of the locking pawl in tip-to-tip engagement with the teeth of the lock cup is around 360 degrees divided by the total number of teeth of the lock cup. Typically for a seat belt retractor with 24 teeth on the lock cup this results in an angle of around 15°, for example between 14° and 16°. The angle between the position of the tip of the inertia member 6 correctly engaging a ratchet tooth and the position of the inertia member 6 engaging the tip of an adjacent ratchet tooth is 15 degrees, which means that there is no phase change. In this way an elimination of jamming with no reduction in torque capacity, is achieved. The chosen value of 15 degrees may be approximated by 1 to 2 degrees either side depending upon the particular configuration of the seat belt retractor components to allow for some flexure of components. The arc subtended by a line between the full engagement position 6 of the inertia member and the tip-to-tip position 6 is centered on the pivot point 2 of the inertia member.

Various features of the invention, which are, for clarity, described in the contexts of separate embodiments, may also be provided in combination in a single embodiment. Conversely, various features of the invention which are, for brevity, described in the context of a single embodiment may also be provided separately or in any suitable subcombination.

We claim:

1. A seat belt retractor having a web sensor comprising an inertia member, having a locking pawl integral therewith, the locking pawl has a locking tip between a leading edge and a trailing edge and a lock cup comprising a set of radially inwardly pointing teeth for engaging with the locking pawl, each tooth has a leading edge, a trailing edge, and a tip between the leading and the trailing edge, wherein the shape and profile of the locking pawl complements the shape of the teeth, the inertia member is eccentrically pivotally mounted to the lock cup, wherein the leading edge of each tooth comprises two sections of different gradients, a first section adjacent the tip of the tooth and a second section of a complementary profile to the leading edge of the locking pawl.

2. The seat belt retractor according to claim 1 wherein the web sensor is arranged so that an angle subtended at the center of rotation of the lock cup by the position of the locking pawl in full locking engagement with the teeth of the lock cup, and the position of the locking pawl in tip-to-tip engagement with the teeth of the lock cup is around 360 degrees divided by the total number of teeth of the lock cup.

3. The seat belt refractor according to claim 2 wherein the angle is between 14 and 16 degrees.

4. The seat belt retractor according to claim 2 wherein the angle is about 15 degrees.

5. The seat belt retractor according to claim 1 wherein the lock cup teeth each also have an intermediate section between the trailing edge and the leading edge of the adjacent tooth.

6. The seat belt retractor according to claim 1 wherein the lock cup teeth are shaped like a shark's teeth.

* * * * *